April 9, 1929.  C. VON HOFE  1,708,746
PANORAMA EXHIBITING APPARATUS
Filed March 14, 1928   2 Sheets-Sheet 1
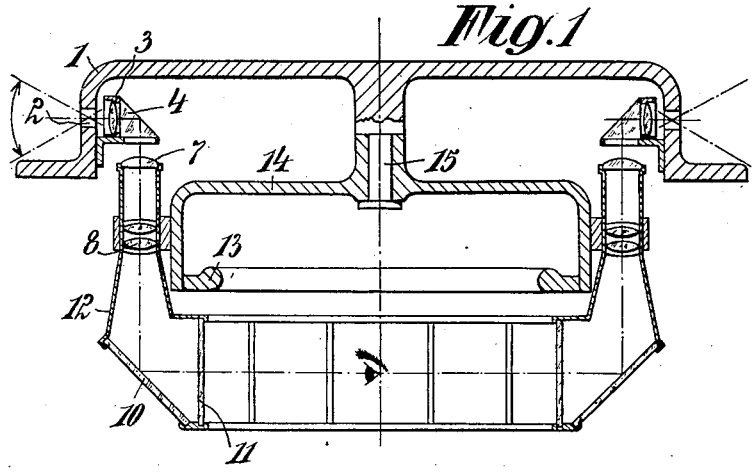
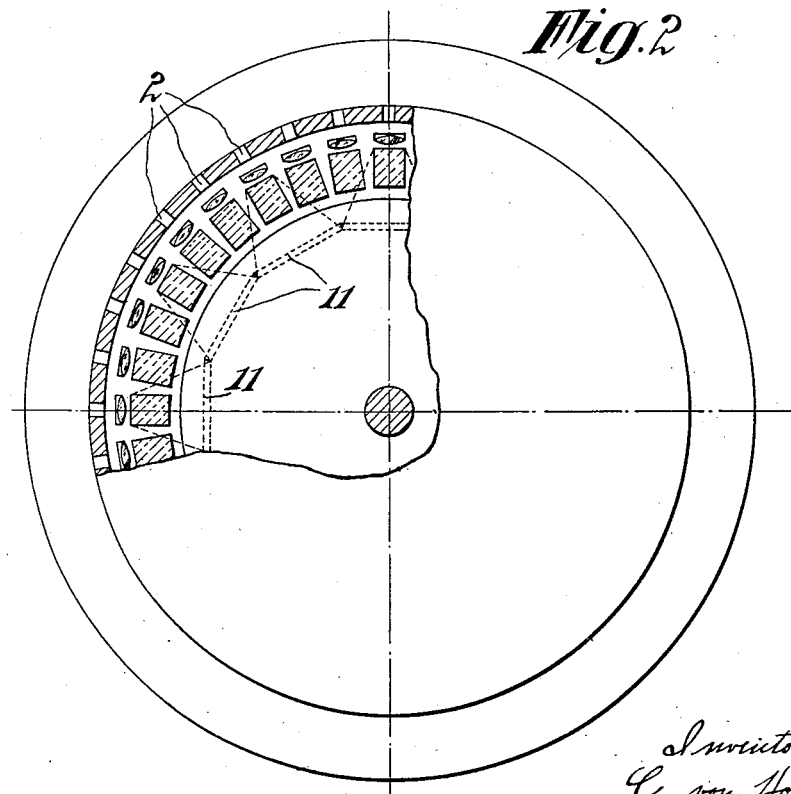

April 9, 1929.   C. VON HOFE   1,708,746
PANORAMA EXHIBITING APPARATUS
Filed March 14, 1928   2 Sheets-Sheet 2

Inventor:
C. von Hofe
By Langner, Parry, Card & Langner
Attys

Patented Apr. 9, 1929.

1,708,746

UNITED STATES PATENT OFFICE.

CHRISTIAN von HOFE, OF VIENNA, AUSTRIA, ASSIGNOR TO COMPANY C. P. GOERZ OPTISCHE ANSTALT AKTIENGESELLSCHAFT, AKCIOVA SPOLECNOST K. P. GOERZ OPTICKY USTAV, OF BRATISLAVA, CZECHOSLOVAKIA.

PANORAMA-EXHIBITING APPARATUS.

Application filed March 14, 1928, Serial No. 261,626, and in Germany April 16, 1927.

The object of the present invention is to provide for the exhibition of a panorama having no interruptions for such points of observation in which the eyes of the observer are below the level of the light admitting openings, for which reason this apparatus is more particularly suitable for the observation or conning towers of armoured vehicles of all kinds.

The object aimed at is obtained according to the invention by providing within the cylindrical observation tower and between the light admitting openings and the eye point of the observer such a number of optical projection systems with the use of frosted glass plates or screens for the image planes constituting the sides of a polygon closed upon itself that the entire surrounding ground is made to appear without any interruption or gaps, these individual optical systems being provided for the purpose of a ready exchange of the parts located at the light admission openings and hence exposed to injury from the outside, with exchangeable light admission elements, which, after having been injured may be thrown out of the path of the image producing rays by turning one part of the projection system around a vertical axis, while at the same time the adjacent uninjured light admission system is thrown into the path of the image producing rays.

In the annexed drawings three constructional forms of the subject matter of the invention are shown by way of example.

Figs. 1 and 2 are a vertical axial section and a plane view respectively of a panorama exhibiting apparatus with positive lens and reflecting light admission systems.

Figure 3:
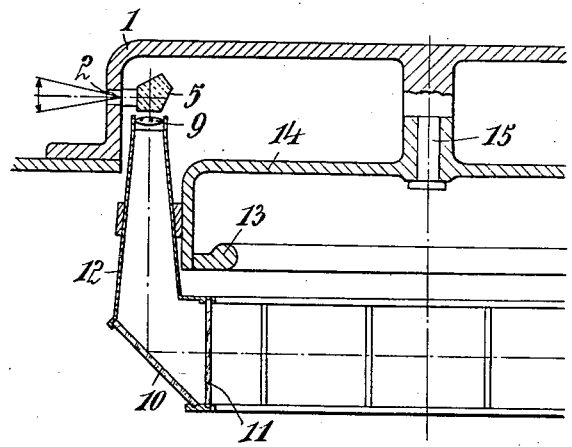
Fig. 3 is a vertical axial section of the panorama exhibiting apparatus with a simple reflecting light admission system.

In Figs. 1 to 4, 1 is the top covering of the observation or conning tower in the circumferential wall of which numerous small equidistant light admission openings 2 are provided and located in a horizantal plane. In Fig. 1 opposite each opening a stationary light admission system is mounted which consists of a positive objective 3 and a simple prism 4 associated thereto and acting as a mirror, or of a pentagonal prism 5 without any lens (Fig. 3) or which consists for increasing the field of vision of a negative lens 6 with a pentagonal prism 5$^a$ (Fig. 4) associated thereto.

Figure 4:
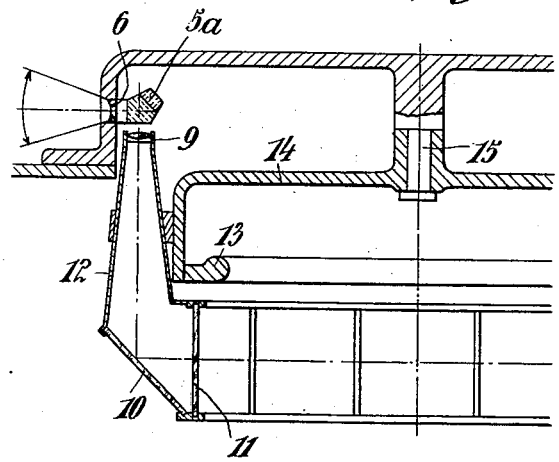
Fig. 4 is a vertical axial section with a negative lens and reflecting light admission system.

The pencils of light reflected downwardly by each of these systems converging in the first case, parallel to each other in the second case and diverging in the third case, are caused to pass through the lower field of vision system associated to the upper optical system which in the case of converging pencils of light consists of the collective lens 7, the reversing system 8 (Fig. 1) and in the case of parallel or diverging pencils of light, consists of the achromatic objective 9 (Figs. 3 and 4). In any case the pencils of light having passed through are reflected by the mirror 10 inclined at an angle of 45° onto the vertical frosted glass plate 11 where they are focused, so that the part of the surrounding ground corresponding to the field of vision of the optical system is nicely projected on the said plate. Therefore in order to secure that the entire surrounding ground is made to appear without interruptions or gaps, there are required as many optical frosted plate systems as the angle of the field of vision of one system is contained in 360°. If, inversely, it is assumed that $n$ is the number of the frosted plate systems (for instance $n=12$ as shown in Fig. 2) to each system an angle of the field of vision $$\alpha = \frac{360°}{n} = 30°$$

has to be given for showing the surrounding ground without any interruption or gap.

The sets of optical elements 7, 8, 10, 11 and 9, 10, 11 are each contained in a casing 12 and all of these casings are secured in a protecting dome 14 provided with a hand wheel 13 and adapted to turn around a vertical journal pin 15 of the top covering 1.

In the constructional forms shown by way of example there are three times as many light admission systems as are required for a gapless representation of the surrounding ground in order that notwithstanding any injury to one of them a gapless representation of the surrounding ground may be obtained by throwing the injured light admission system out of the path of the image producing rays and throwing the adjacent uninjured one into such path by turning the protecting dome 14.

It does not matter for realizing the desired substitution for an injured light admission system of an uninjured one which of the two optical systems, the upper light admission system or the field of vision system below the same, is the stationary one connected with the top covering 1 and the horizontally rotatable one connected with the protecting dome 14.

For some of the frosted glass plates 11 or for all of them complete eye pieces may be substituted which are more expensive than the former, but offer the advantage of a greater intensity of light.

What I claim is:

1. A panorama exhibiting apparatus comprising a top covering a plurality of circumferentially spaced light admission openings arranged in a horizontal plane in said top covering, optical light admission systems associated with each of said light admission openings and comprising reflecting elements and adapted to reflect horizontal rays entering through the said light admission openings in a vertical direction, a protecting dome adapted to rotate within the said top covering around a vertical axis, a plurality of equidistant optical field of vision systems arranged in a circle concentric with the said protecting dome and comprising reflecting elements adapted to reflect incoming vertical rays in a horizontal direction in a level below that of the said light admission openings, one of the said pluralities of optical systems being fast on the said top covering and the other on the said protecting dome, the number of the said optical light admission systems being at least equal to the number of the optical field of vision systems, the optical axes of adjacent ends of the said optical light admission and field of vision systems coinciding with each other whenever two of such systems come opposite each other and the sum of the angles of the fields of vision of the optical field of vision systems being 360°.

2. A panorama exhibiting apparatus comprising a top covering, a plurality of circumferentially spaced light admission openings arranged in a horizontal plane in said top covering, optical light admission systems associated with each of such light admission openings and comprising reflecting elements and adapted to reflect horizontal rays entering through the said light admission openings in a vertical direction, a protecting dome adapted to rotate within the said top covering around a vertical axis, a plurality of equidistant optical field of vision systems arranged in a circle concentric with the said protecting dome and comprising reflecting elements adapted to reflect incoming vertical rays in a horizontal direction in a level below that of the said light admission openings, one of the said pluralities of optical systems being fast on the said top covering and the other on the said protecting dome, the number of the said optical light admission systems being a multiple of the number of the optical field of vision systems, the optical axes of adjacent ends of said optical light admission and field of vision systems coinciding with each other whenever two of such systems come opposite each other and the sum of the angles of the fields of vision of the optical field of vision systems being 360°.

In testimony whereof he affixed his signature.

CHRISTIAN von HOFE.